June 4, 1940.                    E. M. LYON                    2,203,203
                               LIVE BAIT BOX
                             Filed Jan. 22, 1938
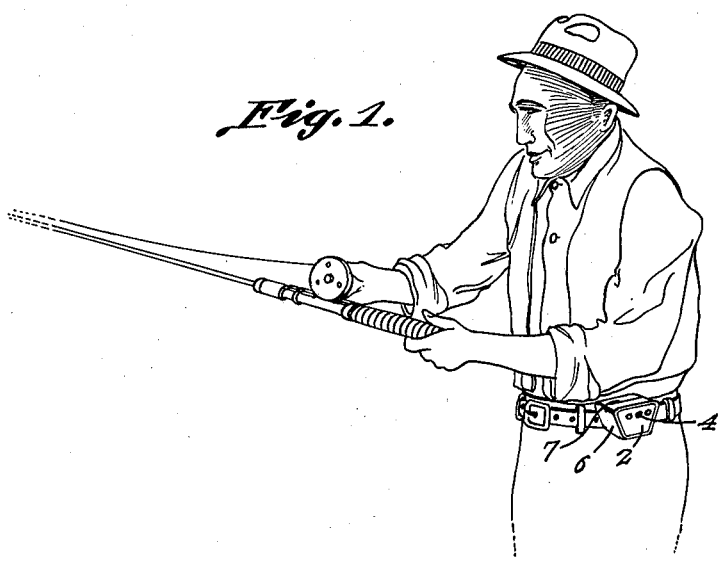
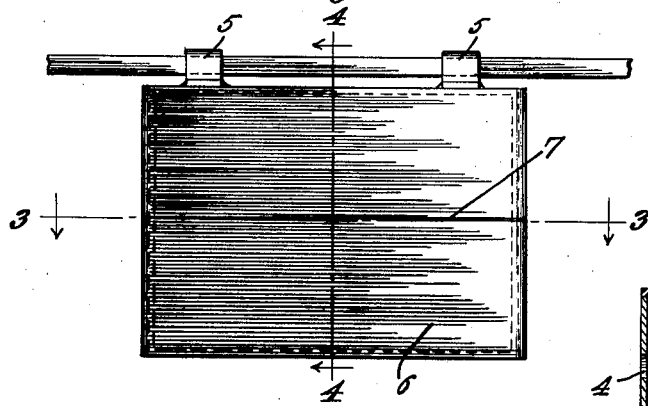
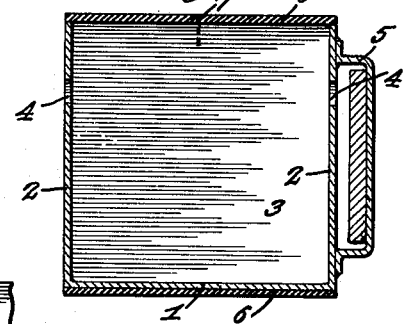
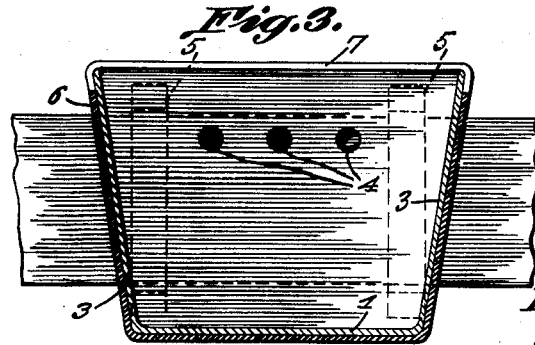
Edward M. Lyon, INVENTOR
BY Victor J. Evans & Co.
ATTORNEYS Patented June 4, 1940

2,203,203

UNITED STATES PATENT OFFICE 2,203,203

LIVE BAIT BOX

Edward M. Lyon, Bozeman, Mont.

Application January 22, 1938, Serial No. 186,442

1 Claim. (Cl. 43—55)

This invention relates to fish bait boxes, and its general object is to provide a box which is primarily designed to house live bait such as small frogs, grasshoppers, flies and the like and which can be inserted within the box and individually removed therefrom, in an easy and expeditious manner, but escape or casual removal is practically impossible.

A further object is to provide a fish bait box that can be attached to the waist encircling belt of the user and carried accordingly for disposal in convenient reach when it is desired to remove bait therefrom.

Another object is to provide a fish bait box of the character set forth, that is simple in construction, inexpensive to manufacture, and extremely efficient in use and service.

This invention also consists in certain other features of construction and in the combination and arrangement of the several parts, to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which:

Figure 1 is a view illustrating my bait box attached to the waist encircling belt of the user.

Figure 2 is a top plan view of the box in applied position.

Figure 3 is a sectional view taken approximately on line 3—3 of Figure 2, looking in the direction of the arrows.

Figure 4 is a sectional view taken approximately on line 4—4 of Figure 2, looking in the direction of the arrows.

Referring to the drawing in detail, it will be noted that the body of my box includes a bottom 1, parallel side walls 2, and front and rear walls 3, which together with the side walls 2 are formed on the bottom 1, and in the form as shown, the front and rear walls 3 are outwardly flared with respect to the bottom 1 for disposal in diverging relation with respect to each other.

The walls 2 and 3 are of equal height and it will be noted that the side walls 2 are provided with vent openings 4, arranged adjacent to the upper edges thereof, as best shown in Figure 4.

While the body of the box may be made from any material suitable for the purpose, it is preferably made from rust proof metal, and one of the side walls has secured thereto a pair of belt loops 5, so that the box can be applied to the waist encircling belt of the user in the manner as clearly shown in Figures 1 and 2.

The upper end of the body is open, but is covered by an endless elastic band 6 which is of a width co-extensive with that of the body and is disposed about the same in stretched condition as will be obvious upon inspection of Figure 3. The band 6 is preferably made from rubber, and the portion thereof which extends across the upper end of the body is slit along the longitudinal center thereof as at 7 for disposal with respect to the open upper end of the body accordingly, and the slit is preferably of a length so that the end portions thereof extend to the front and rear walls 3, as well as downwardly thereof, as shown in Figure 3.

It will be obvious that the slit 7 provides means whereby access may be had to the interior of the box, so that the bait can be inserted therein, and removed therefrom, and due to the elasticity of the band 6, it will be further obvious that the edges of the slit are normally held in contacting engagement, therefore preventing the escape of the bait or casual removal from the box.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:

A bait box adapted to be suspended from the body of the user, comprising a body including a bottom wall and an open top, parallel side walls and outwardly flared front and rear walls rising from the bottom wall, said side walls having vent openings adjacent to the upper ends thereof, and a single rubber band tautly surrounding the body about the open top, front, rear and bottom walls and being of a width to entirely cover the open top, said band being slit along the longitudinal center thereof and said slit being of a length for disposal across the center of the open top and slightly down the front and rear walls to allow free opening of the slit for ready access to the interior of the body, all of said walls being straight and said front and rear walls being formed with the bottom wall to provide substantially square corners tending to prevent slippage of the band about the body to retain the slit in the position set forth.

EDWARD M. LYON.